Figures 1, 2, 3:
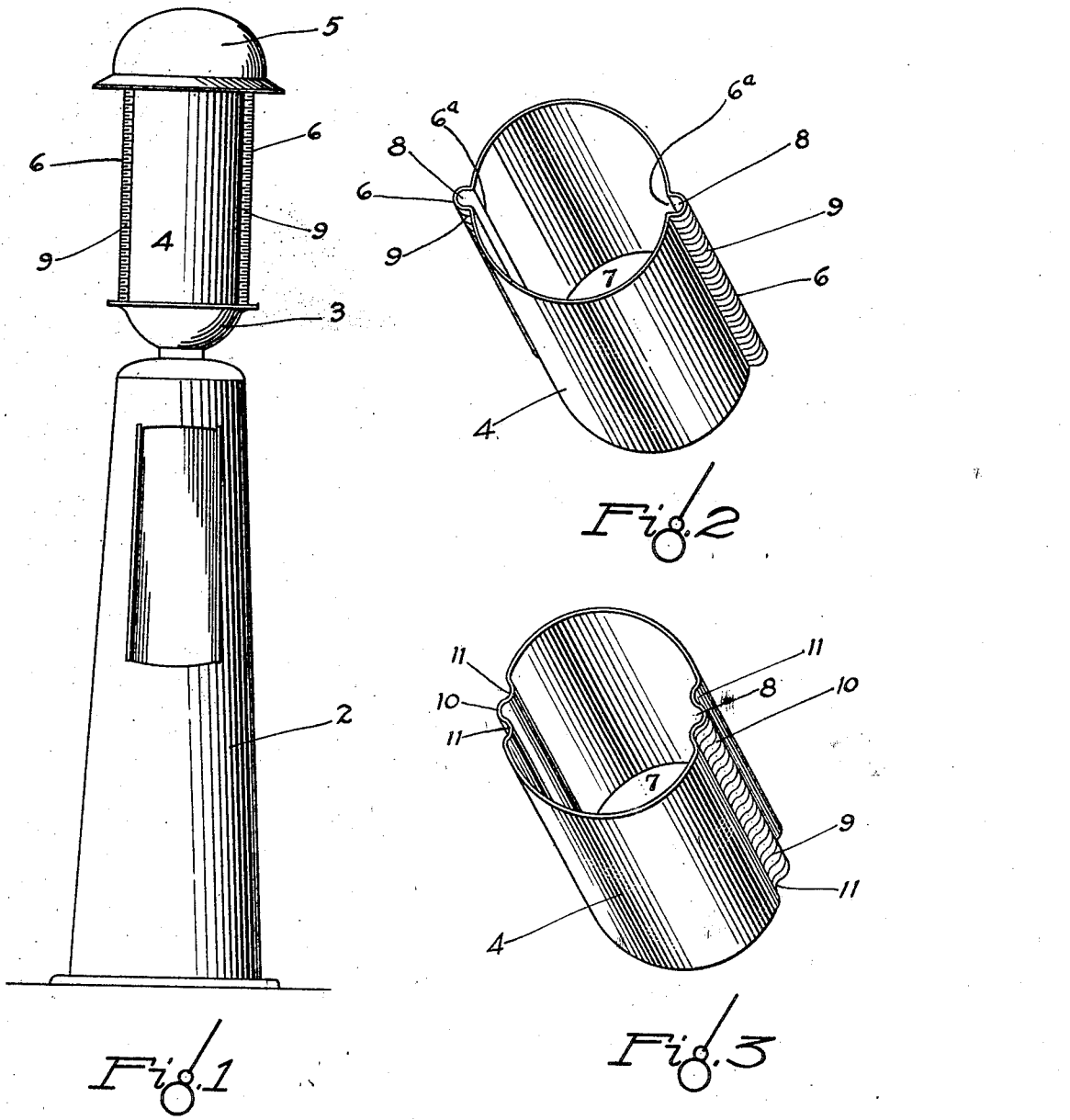

F. L. GABRIS.
LIQUID DISPENSING TANK.
APPLICATION FILED MAR. 5, 1921.

1,434,948.

Patented Nov. 7, 1922.

Inventor
Filbert L. Gabris
By Paul & Paul
His Attorneys

Patented Nov. 7, 1922.

1,434,948

UNITED STATES PATENT OFFICE.

FILBERT L. GABRIS, OF ST. PAUL, MINNESOTA, ASSIGNOR OF ONE-HALF TO CHARLES E. McLAUGHLIN, OF ST. PAUL, MINNESOTA.

LIQUID-DISPENSING TANK.

Application filed March 5, 1921. Serial No. 449,919.

*To all whom it may concern:*

Be it known that I, FILBERT L. GABRIS, a citizen of the United States, resident of St. Paul, county of Ramsey, State of Minnesota, have invented certain new and useful Improvements in Liquid-Dispensing Tanks, of which the following is a specification.

In the operation of a liquid measuring apparatus adapted particularly for vending gasoline for vehicles, considerable difficulty is experienced in accurately measuring the quantity to be delivered, owing to the rapid flow into the measuring tank and the corresponding rapid change in the level of the liquid therein, due principally to the comparatively large area of the liquid surface and the fact that the agitation of the liquid in such a receptacle prevents the observer from determining with any degree of accuracy just when the proper amount of liquid has been delivered to obtain the desired measure.

The object, therefore, of my invention is to provide an adjunct to a measuring tank which will provide means for so confining the liquid that undue agitation thereof will be prevented and the rise of the level within the confined space will be uniform and the operator can very accurately measure the liquid delivered to the tank.

The invention consists generally in various constructions and combinations, all as hereinafter described and particularly pointed out in the claims.

In the accompanying drawings forming part of this specification,

Figure 1 is a side elevation of a liquid measuring apparatus embodying my invention, Figure 2 is a perspective view of a portion of the measuring tank, Figure 3 is a similar view illustrating a modified construction, In the drawing, 2 represents the base of the structure, wherein the operating mechanism is arranged, but as this forms no part of my present invention, detailed description and illustration is unnecessary. At the top of this standard or base is a support 3 whereon is seated the measuring tank 4, preferably cylindrical in form, having transparent walls, preferably of glass, and surmounted by a suitable dome or cap 5. In the walls of this tank I provide ribs 6 extending from the top to the bottom thereof and formed integrally with the walls of the tank in molding, and gaps 6ª lead from the chamber 7 within the tank to the vertical space 8 formed by the ribs 6. The walls of the ribs 6 are suitably graduated, as indicated at 9. When the liquid flows into the tank, it will pass through the gaps 6ª into the hollow ribs and rising slowly therein, the level can be readily followed by means of the graduations on the walls of the ribs. The liquid being confined by the walls of the ribs, cannot become unduly agitated by the rapid inflow and the changes in the level of the liquid will be gradual and uniform and the operator, standing on either side of the tank or at the front or the rear, can readily measure the desired amount of the liquid and the purchaser can also, standing in different positions, read the graduations and ascertain with accuracy the exact amount of liquid that he is purchasing. These tank walls are of considerable thickness and the ribs are much stronger and more durable than ordinary water glass devices, which are frequently used for indicating the level of the liquid in a tank. The ordinary glass is objectionable in this relation, as it projects a considerable distance from the tank and is easily broken, while these ribs, being molded with the comparatively thick walls, are strong and durable and at the same time permit the observer to accurately follow the level of the liquid.

In Figure 3 I have shown a modified construction, which consists in forming a corrugation in the wall of the tank, preferably on each side thereof, the rib portion of the corrugations being indicated by reference numeral 10 and the grooves on each side thereof by numeral 11. The advantage of this type of indicator is that it lies substantially within the circle of the periphery of the walls of the tank and is to a certain degree protected thereby. It has, however, the comparatively narrow confined space communicating with the interior of the tank in which the liquid will gradually rise with uniformity and enable the operator and purchaser to accurately follow the level and cut off the flow when the desired graduation is reached. In tanks as ordinarily constructed, where the graduation is directly on the tank wall, it is almost impossible for the operator to stop the flow at the desired point. It either runs short or over. This is due to the fact that a considerable volume of liquid is rushing into the tank and the body of liquid therein is agitated, causing waves to flow toward the walls of the tank and preventing the liquid from settling to a uniform level. When, however, these waves are broken up, as by the walls of the ribs or corrugations in the tank, undue agitation is prevented, the rise of the liquid along the graduation marks is uniform, and the operator of the apparatus can easily regulate the flow of the liquid to obtain the desired measure without danger of its over-running or being short of the mark.

I claim as my invention:

1. A liquid measuring tank having a hollow external integral rib extending longitudinally thereof and provided with graduations, the wall of said tank having a narrow elongated gap forming a communicating passage between the interior of said tank and the space within said rib, the confined area of said space preventing agitation of the liquid and insuring a uniform gradual rise thereof on said graduations.

2. A liquid measuring tank having a hollow rib extending longitudinally thereof and provided with graduations, the wall of said tank having an elongated gap extending the length of said rib and leading from the liquid chamber of said tank to the space within said rib, the confined area of said space preventing agitation of the liquid and insuring a uniform gradual rise thereof on said graduations.

In witness whereof, I have hereunto set my hand this 26th day of February, 1921.

FILBERT L. GABRIS.